US 10,295,839 B2

(12) United States Patent
Yagi

(10) Patent No.: US 10,295,839 B2
(45) Date of Patent: May 21, 2019

(54) LENS BARREL

(71) Applicant: KOWA COMPANY, LTD, Aichi (JP)

(72) Inventor: Hirofumi Yagi, Aichi (JP)

(73) Assignee: KOWA COMPANY, LTD., Aichi (JP)

( * ) Notice: Subject to any disclaimer, the term of this patent is extended or adjusted under 35 U.S.C. 154(b) by 0 days.

(21) Appl. No.: 15/317,192

(22) PCT Filed: Apr. 27, 2015

(86) PCT No.: PCT/JP2015/062669
§ 371 (c)(1),
(2) Date: Dec. 8, 2016

(87) PCT Pub. No.: WO2015/190182
PCT Pub. Date: Dec. 17, 2015

(65) Prior Publication Data
US 2017/0102554 A1    Apr. 13, 2017

(30) Foreign Application Priority Data
Jun. 9, 2014    (JP) .................................. 2014-118453

(51) Int. Cl.
*G02B 7/02* (2006.01)
*G02B 27/64* (2006.01)
(Continued)

(52) U.S. Cl.
CPC ............. *G02B 27/646* (2013.01); *G02B 7/02* (2013.01); *G02B 7/021* (2013.01); *G02B 7/025* (2013.01);
(Continued)

(58) Field of Classification Search
CPC ........ G02B 27/646; G02B 7/021; G02B 7/02; G02B 7/025; G02B 7/026; H04N 5/2254; H04N 5/2328
(Continued)

(56) References Cited

U.S. PATENT DOCUMENTS 1,848,402 A * 3/1932 Wollensak ............... G02B 7/04
359/739
3,761,162 A * 9/1973 Hall ....................... G02B 15/00
359/668
(Continued)

FOREIGN PATENT DOCUMENTS

JP    2003-21782 A    1/2003
JP    2005-241842 A    9/2005
(Continued)

OTHER PUBLICATIONS

Canon U.S.A., Inc., EF 70-200mm f/4L USM for Sale in the USA on Aug. 30, 2013. https://web.archive.org/web/20130830002035/ https://shop.usa.canon.com/shop/en/catalog/ef-70-200mm-f-4l-usm https://shop.usa.canon.com/shop/en/catalog/ef-70-200mm-f-4l-usm.*

(Continued)

*Primary Examiner* — William R Alexander
(74) *Attorney, Agent, or Firm* — Duane Morris LLP

(57) ABSTRACT

[Problem] To make it possible to prevent vibrations or the like from causing focus or zoom slippage or the like in a lens that is mounted to a camera body that is used in a fixed location outdoors for many years for security purposes or is used inside a building that is subject to a variety of variations, such as a camera that is used for quality-checking purposes or the like at a production site in a factory.
[Solution] The lens barrel (1) in this invention has the following: a fixed tube section (10) that is mounted to a camera body (B); a movable tube section (20) that is movably screwed to the fixed tube section (10); and a nut member (12) that, screwed to the movable tube section (20), is energized towards top end (10b) of the fixed tube section (10). The nut member (12) acts as a double nut, making it possible to inhibit rotation of the fixed tube section (10) and (Continued)

the movable tube section (20) relative to each other, preventing focus or zoom slippage or the like.

19 Claims, 6 Drawing Sheets

(51) Int. Cl.
    *G03B 9/02*          (2006.01)
    *G03B 15/00*        (2006.01)
    *G03B 17/14*        (2006.01)
    *H04N 5/225*       (2006.01)
    *H04N 5/232*       (2006.01)

(52) U.S. Cl.
    CPC ............... *G03B 9/02* (2013.01); *G03B 15/00* (2013.01); *G03B 17/14* (2013.01); *H04N 5/2254* (2013.01); *H04N 5/2328* (2013.01)

(58) Field of Classification Search
    USPC .................. 359/827, 819, 823, 826, 829
    See application file for complete search history.

(56) References Cited

U.S. PATENT DOCUMENTS

| | | | | |
|---|---|---|---|---|
| 4,568,165 A * | 2/1986 | Ishibashi | ................ | G02B 7/08 352/140 |
| 5,299,067 A * | 3/1994 | Kutz | ................ | F41G 1/14 359/422 |
| 5,587,754 A * | 12/1996 | Katayama | ................ | G02B 7/10 359/694 |
| 5,668,670 A * | 9/1997 | Nakayama | ................ | G02B 7/10 359/694 |
| 5,831,778 A * | 11/1998 | Chueh | ................ | G02B 7/04 359/823 |
| 5,940,228 A * | 8/1999 | Burnett | ................ | G02B 23/12 359/410 |
| 7,596,309 B2 * | 9/2009 | Hsiao | ................ | G03B 13/34 359/824 |
| 2014/0204482 A1 * | 7/2014 | Izumi | ................ | G02B 7/102 359/817 |
| 2014/0218813 A1 * | 8/2014 | Araki | ................ | G02B 7/021 359/819 |

FOREIGN PATENT DOCUMENTS

| | | |
|---|---|---|
| JP | 2009-244773 A | 10/2009 |
| JP | 2013-84016 | 9/2013 |
| JP | P5372385 | 9/2013 |

OTHER PUBLICATIONS

International Search Report corresponding to International Application No. PCT/JP2015/062669 dated Jul. 28, 2015 and completed by Japanese Patent Office, pp. 1, 2.

External view of high resolution 1 type 6MP lens (LM16SC) (https//:lenses.kowa-usa.com.6mp-plus-sc-series/1240-lm16sc.html.

* cited by examiner

LENS BARREL

TECHNICAL FIELD

This invention relates to a lens barrel that is configured so as to be freely attached to and detached from a camera body.

BACKGROUND ART

Cameras have been installed indoors or outdoors of a building for various kinds of purposes including detection of an inspection line or the position detection of a robot to be produced in a factory, and security. In some such cameras, a lens barrel can be attached thereto and detached therefrom, and various kinds of lens barrels have been proposed (for instance, see non-patent related document 1 and patent related documents 1 and 2).

FIG. 5 is a side view that shows an instance of a conventional configuration of a lens barrel configured to be attached to and detached from a camera body, a reference number B in the figure denotes a camera body, and a reference number 100 denotes the lens barrel to be attachably and detachably installed on the camera body. Such lens barrel 100 is comprised of a plurality of tube sections, 101A and 101B, configured so as to adjust a focus by relatively rotating the tube sections 101A and 101B. A reference number 102 denotes a locking screw for fixing the respective tube sections 101A and 101B so as not to shift their rotational positions.

PRIOR ART

Nonpatent Related Document

Non-Patent related document 1:
Lens corresponding high definition type 16 megapixel over camera, Kowa company, Ltd. External view of LM16SC (retrieved on May 29, 2014 (Thursday] Internet <URL: http//www.kowa.co.jp/opto/products/pdf/lm16sc.pdf>

Patent Related Document

Patent related document 1: Japanese patent application publication No. 2013-84016
Patent related document 2: Japanese patent No. 5372385

SUMMARY OF INVENTION

Problems to be Solved by Invention

But, the above-mentioned locking screw 102 has such a problem that it is hard to be tightened due to its small diameter.

An object of the invention is to provide the lens barrel for solving the above-mentioned problem.

Means for Solving Problems

The first aspect of the invention is a lens barrel (1, 2, 3) configured to detachably attach to a camera body (B), exemplarily shown in FIG. 1 through FIG. 3(a) and FIG. (6), comprising:

a fixed tube section (10, 20, 30) that has a base end (10a, 20a, 30a) for detachably attaching to a camera body (B), and a top end (10b, 20b, 30b), a pitch screw section (10d, 20d, 30d) on the fixed tube side ("the first pitch screw" hereinafter) being formed on an inner peripheral surface (10c, 20c, 30c) of the top end (10b, 20b, 30b), a movable tube section (11, 21, 31) that is a tube member for holding lens ($A_1$, $A_2$) and has a pitch screw section on the movable side ("the second pitch screw" hereinafter) formed at an outer peripheral surface (11a, 21a, 31a), and is located so as to be movable inside the fixed tube section (10, 20, 30) in such a state that the second pitch screw (11b, 21b, 31b) is threadedly engaged with the first pitch screw (10d, 20d, 30d); and a nut member (12, 22, 32) configured so as to restrict a relative rotation between the fixed tube section (10, 20, 30) and the movable tube section (11, 21, 31) by abutting on the top end (10b, 20b, 30b) of the fixed tube section (10, 20, 30), being engaged with the second pitch screw (11b, 21b, 31b).

The second aspect of the invention is the lens barrel according to the first aspect, detailedly shown in FIGS. 2(a),(b) and FIG. 3(a) and FIG. 6, wherein the movable tube section (21, 31) has a base movable tube section (210, 310) that has the second pitch screw (21b, 31b), a top movable tube section (211, 311) detachably attached to the base movable tube section (210, 310), and a fixed diaphragm plate (212, 314) held between the base movable tube section (210, 310) and the top movable tube section (211, 311).

The third aspect of the invention is the lens barrel according to the second aspect, as exemplarily shown in FIG. 3(b) through (d), further comprising a fixed diaphragm plate for exchange (212A, 212B, 212C) having an opening (212Aa, 212Ba, 212Ca) different from one (not shown) of the fixed diaphragm plate (212).

The fourth aspect of the invention is the lens barrel according to the first aspect, wherein a through hole (a reference number 11c of FIG. 1, and reference numbers 211c, 213c of FIG. 3(a)) is formed at a section that holds the lenses ($A_1$, $A_2$) ("the lens holding section" hereinafter) in the movable tube section;

whereby adhesive (not shown) can be filled between the outer peripheral surface of the lenses ($A_1$, $A_2$) and the lens holding section (11, 211, 213) via the through hole (11c, 211, 213c).

The fifth aspect of the invention is the lens barrel according to the first aspect, as exemplarily shown in FIG. 1 and FIGS. 2(a), (b), further comprising a first knurling (see the reference number 20e) formed on the outer peripheral surface of the fixed tube section (reference number 20 of FIG. 2(a), (b)) that is a projected and recessed section, or/and a second knurling (see the reference number 11d of FIG. 1) formed on the outer peripheral surface of the movable tube section (reference number 11 of FIG. 1) that is a projected and recessed section, wherein the nut members (12, 22) have shapes and/or colors different from the first knurling (20e) and/or the second knurling (11d).

The sixth and seventh aspects of the invention is the lens barrel according to the first aspect, as exemplarily shown in FIG. 6, further comprising an spring member as an elastic member located between the fixed tube section (30) and the movable tube section (31) so as to energize the movable tube section (31) in the optical axis direction (C) of the lens ($A_1$, $A_2$) held by the movable tube section (31).

The number in parentheses shows the corresponding element in the drawings for the sake of convenience, accordingly, the descriptions are not restricted and bound by the descriptions on the drawings.

Effects of Invention

According to the first aspect of the invention, it is possible to restrict the relative rotation between the fixed tube section and the movable tube section through the nut member even if the lens barrel is installed on the camera body that is fixed indoors or outdoors of a building for a long time and receives various kinds of vibrations for this reason, and to prevent a deviation of a focus or a zoom due to the above-mentioned vibrations. Besides, the nut member is easy to be fastened and hard to be unfastened since it has a bigger diameter in comparison with the locking screw exemplarily shown in FIG. 5.

In a case where the diaphragm to be used for the lens barrel is a variable diaphragm, the diaphragm blades against each other due to a situation of an installation place (the vibrations in a plant, and the vibrations received from arms for production in a plant when the camera is set on such arms or the other movable objects), the vibration with earthquakes or the other reasons, and dusts generate, and at the result, an image noise may be generated. But, above-mentioned problem can be solved since the fixed diaphragm plate is used, not the variable diaphragm according to the second and third aspects of the invention.

According to the fourth aspect of the invention, it is possible to prevent the positional shift of the respective lenses from proper positions even if the lens barrel is attached to the camera body for a long term.

According to the fifth aspect of the invention, it is possible to clearly distinguish the first and second knurlings from the nut members through a visual sense and a sense of touch.

According to the sixth and seventh aspects of the invention, the relative movement between the fixed tube section and the movable tube section in the optical axis direction is restricted through the spring member before tightening by the nut member even if some rattling (the rattling in a thrust direction) occurs between the first pitch screw and the second pitch screw, and it is possible to prevent the deviation of the focus and the like due to the relative movement.

EMBODIMENTS FOR CARRYING OUT THE INVENTION

Figure 1:
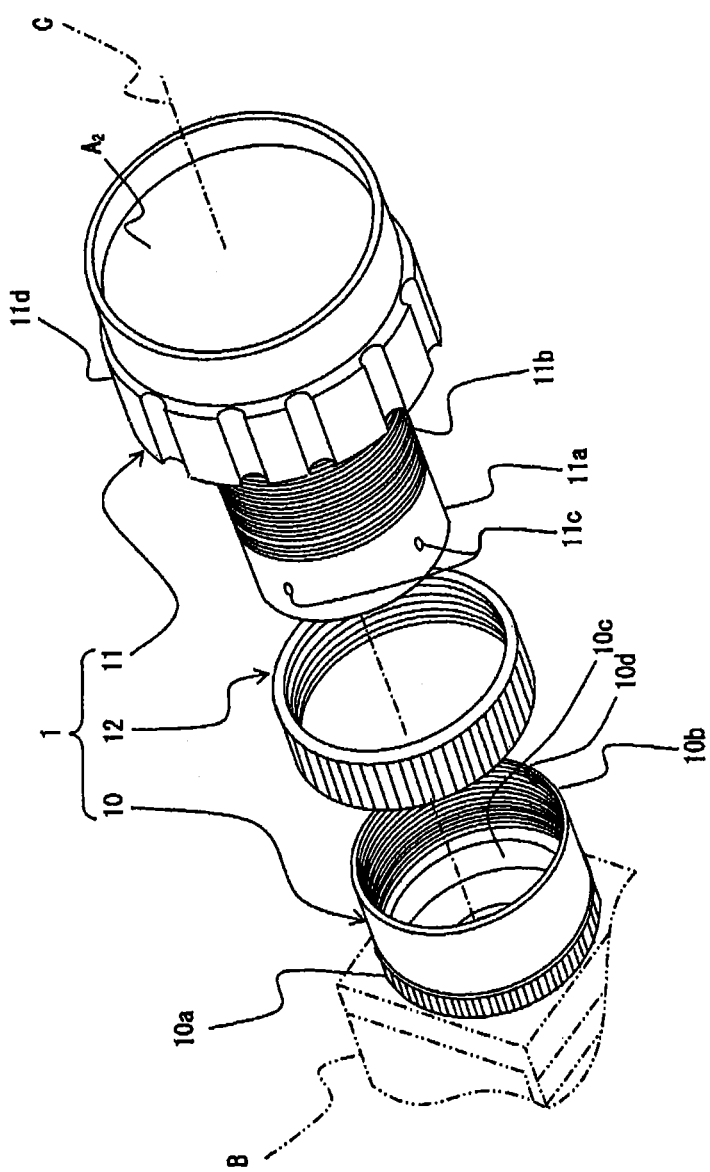
FIG. 1 is a perspective view of disassembled lens barrel according to the invention.
Figure 2:
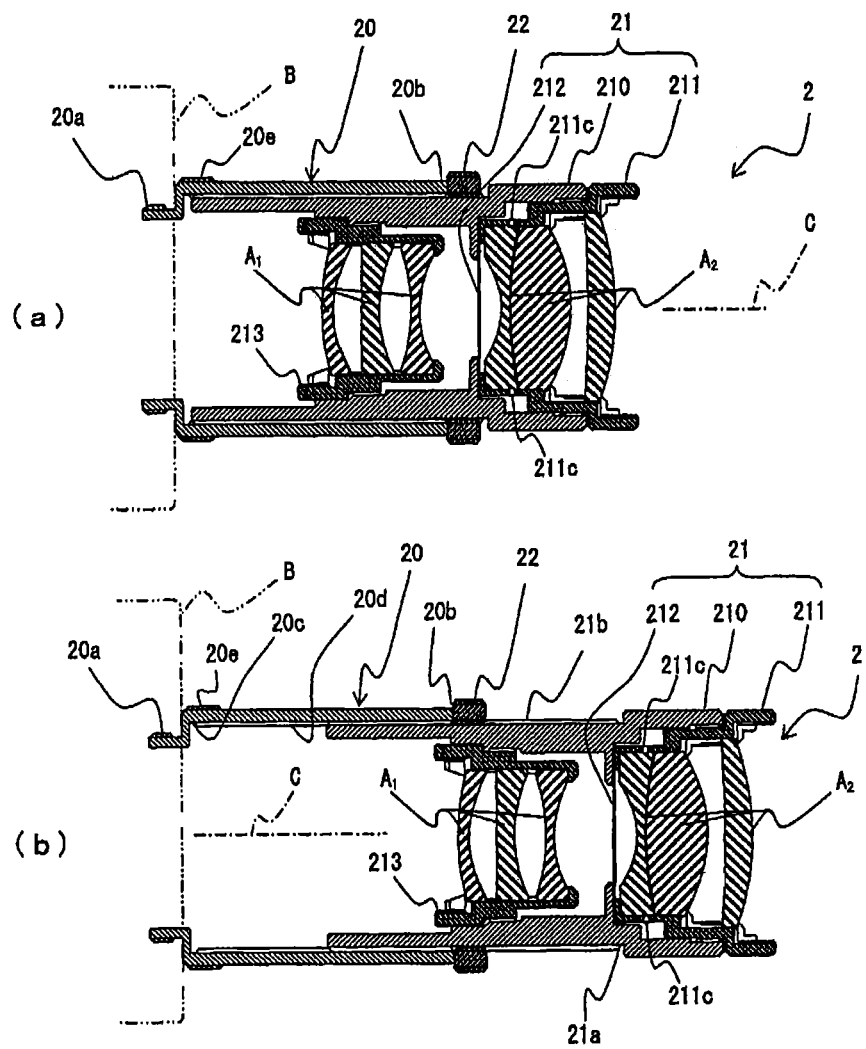
FIG. 2(a), (b) are end views that shows another instances of the lens barrel according to the invention.
Figure 3:
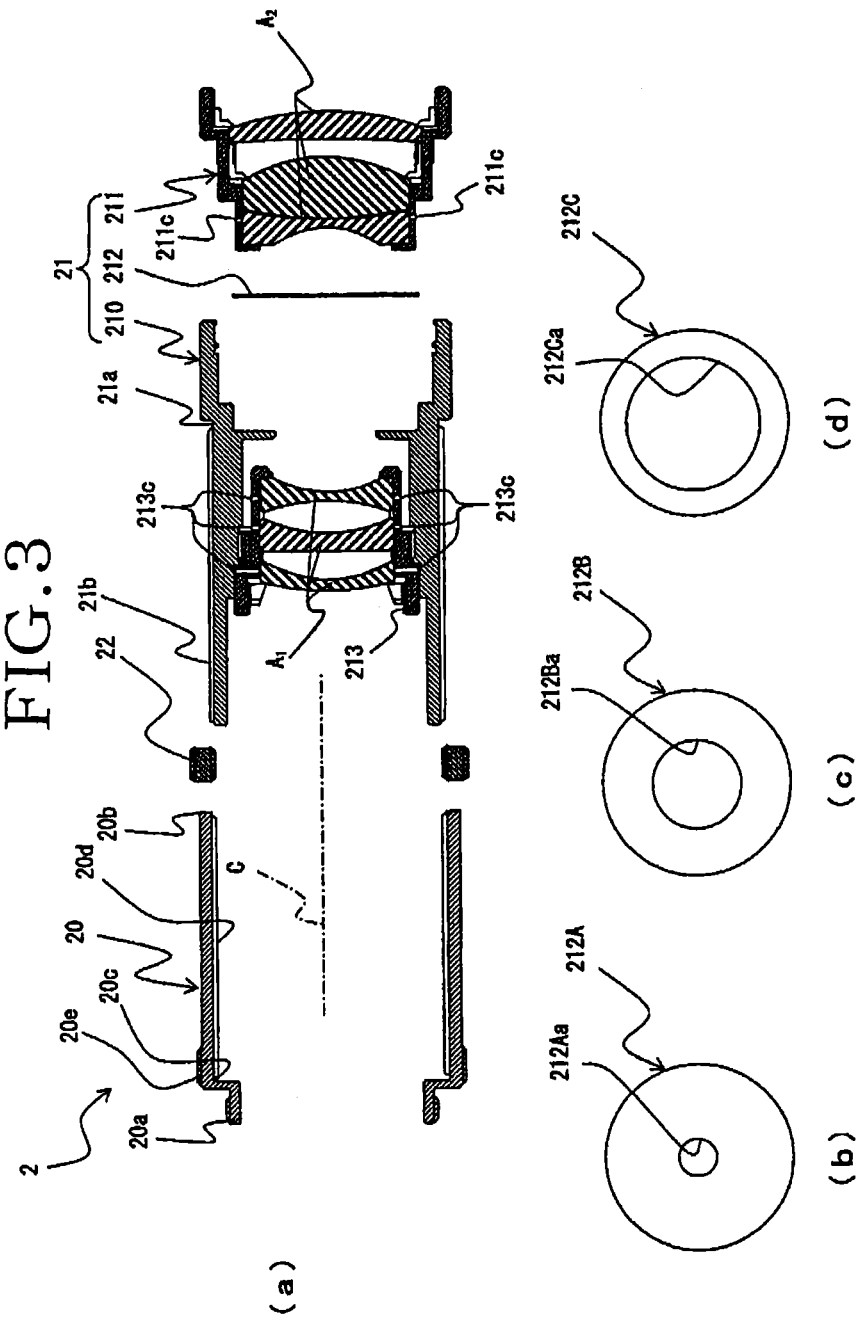
FIG. 3(a) is an end view of disassembled lens barrel as shown in FIGS. 2(a) and (b)
FIGS. 3(b) to (d) are front views that show shapes of diaphragm plates for exchange.
Figure 4:
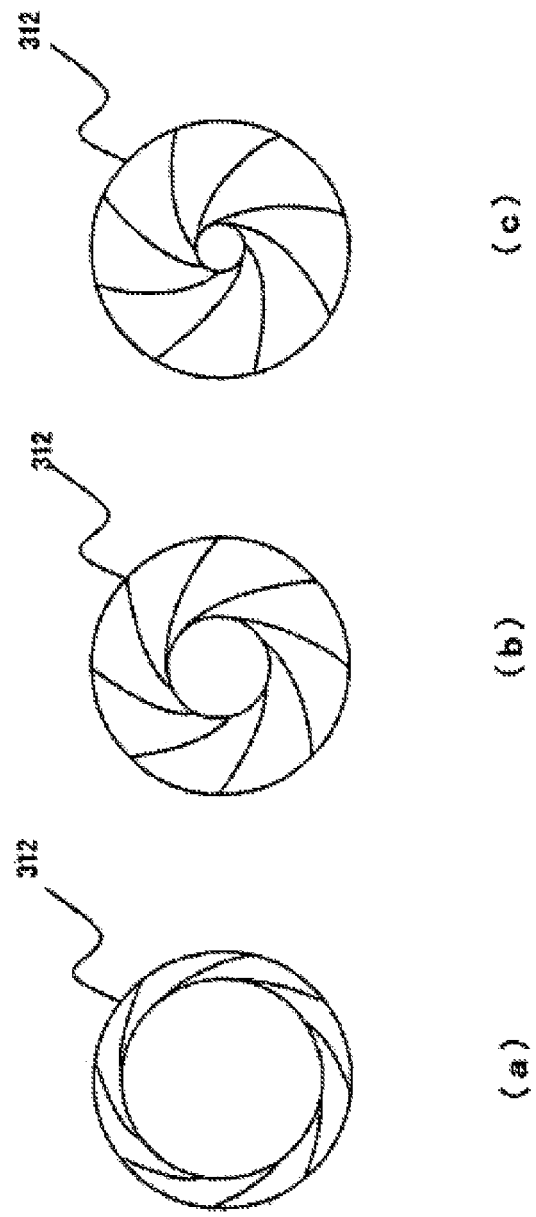
FIGS. 4(a) to (c) are front views that show instances of conventional configurations of the lens barrel.

Embodiments of the invention are mentioned, referring to appended drawings FIGS. 1 to 4, and FIG. 6.

A lens barrel according to the invention is configured so as to be attached to and detached from a camera body. Such a lens barrel is exemplarily shown with reference numbers 1, 2 and 3 in FIG. 1, FIGS. 2(a) and (b), FIG. 3(a) and FIG. 6, and has a fixed tube section 10, 20, 30 that has a base end 10a, 20a, 30a (one end along an optical axis direction C) for detachably attaching to the camera body B, and a top end 10b, 20b, 30b (the other end along the optical axis direction C), a pitch screw section on the fixed tube side 10d, 20d, 30d ("the first pitch screw" hereinafter) being formed on an inner peripheral surface 10c, 20c, 30c of the top end 10b, 20b, 30b, a movable tube section 11, 21, 31, that is a tube member for holding lens $A_1$, $A_2$ and has a pitch screw section on the movable tube side 11b, 21b, 31b ("the second pitch screw" hereinafter) formed at an outer peripheral surface 11a, 21a, 31a, and is located so as to be movable in the optical axis direction C inside the fixed tube section 10, 20, 30 in such a state that the second pitch screw 11b, 21b, 31b is threadedly engaged with the first pitch screw 10d, 20d, 30d, and a nut member 12, 22, 32 (ring nut) that is configured so as to restrict a relative rotation between the fixed tube section 10, 20, 30 and the movable tube section 11, 21, 31 by abutting on the top end 10b, 20b, 30b of the fixed tube section 10, 20, 30, being engaged with the second pitch screw 11b, 21b, 31b. The nut material 12, 22, 32 is preferably formed of hard material (preferably, metal) that is hard to be deteriorated with time.

Figure 5:
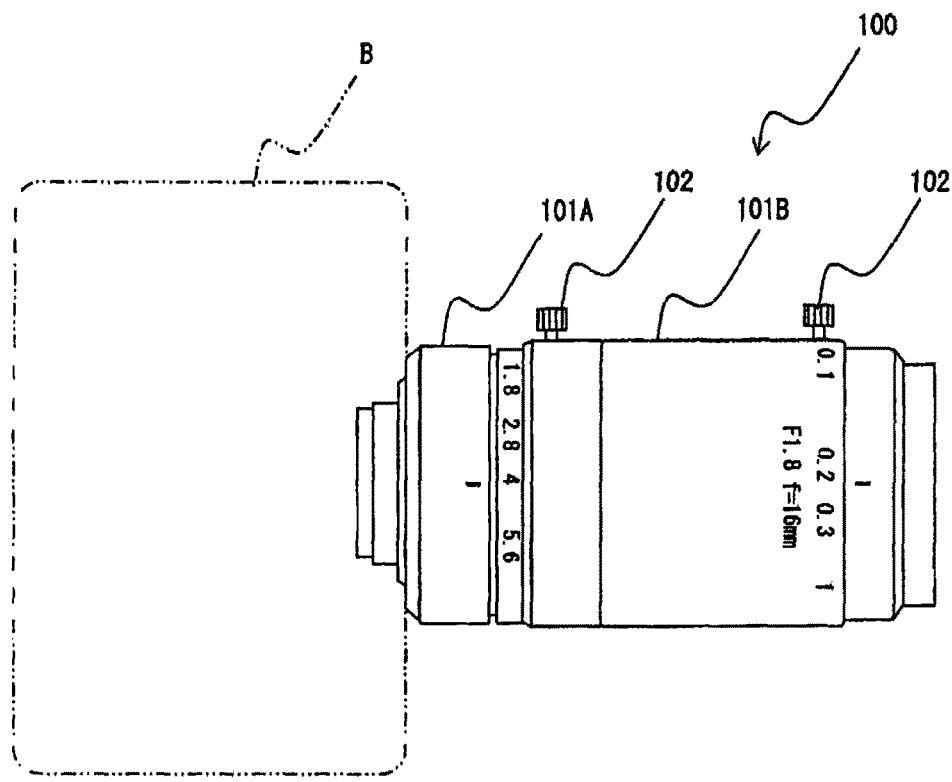
FIG. 5 is a side view that shows an instance of a conventional configuration of the lens barrel.

According to the invention, it is possible to restrict the relative rotation between the fixed tube section 10, 20, 30 and the movable tube section 11, 21, 31 through the nut member 12, 22, 32 even if the lens barrel is installed on the camera body B that is fixed indoors or outdoors of a building for a long time and receives various kinds of vibrations for this reason, and to prevent a deviation of a focus or a zoom due to the above-mentioned vibrations. Besides, the nut member 12, 22, 32 is easy to be fastened and hard to be unfastened since it has a bigger diameter in comparison with the locking screw 102 exemplarily shown in FIG. 5.

In a case of the camera that is fixed inside or outside a building, parts inside of the lens barrel rub against each other due to the vibration with earthquakes or the other reasons, and dusts generate, and at the result, an image noise may be generated. On the other hand, in case of the lens barrel 1, 2, 3 according to the invention, dusts are hard to generate even if the vibrations of earthquakes or the like are received since the nut member 12, 22, 32 is contacted with the whole top end 10b, 20b, 30b of the fixed tube section 10, 20, 30 and the contact area is relatively large, and the above-mentioned problem can be solved.

Figure 6:
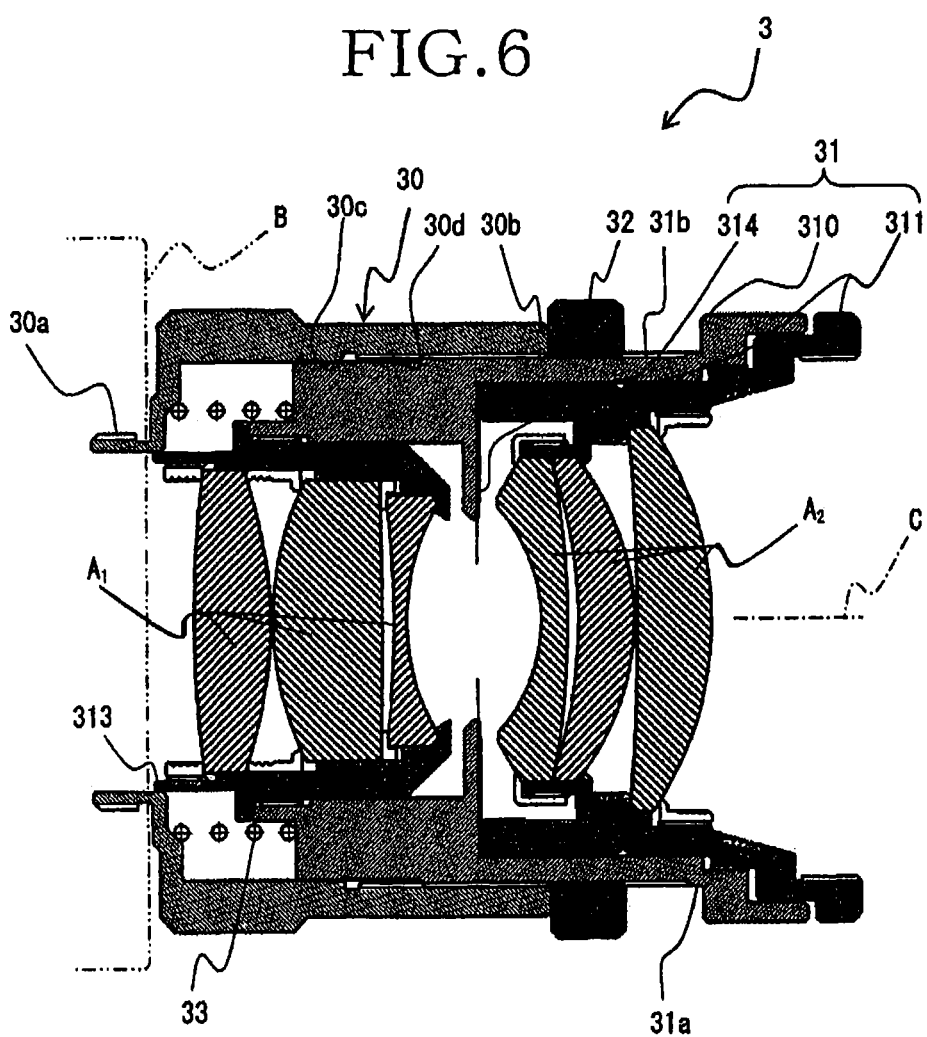
FIG. 6 is an end view that shows another instance of the lens barrel according to the invention.

In such a case, as detailedly shown with a reference number 21, 31 as shown in FIGS. 2(a), (b), FIG. 3(a) and FIG. 6, the movable tube section may have a base movable tube section 210, 310 that has the second pitch screw 21b, 31b, a top movable tube section 211, 311 detachably attached to the base movable tube section 210, 310, and a fixed diaphragm plate 212, 314 held between the base movable tube section 210, 310 and the top movable tube section 211, 311. For instance, preferably, a pitch screw section (not shown) is formed on an inner or outer peripheral face of the top movable tube section 211, 311 and a pitch screw section (not shown) is formed on an inner or outer peripheral face of the base movable tube section 210, 310 so that the top movable tube section 211, 311 can be detachably attached to the base movable tube section 210, 310. Preferably, the lenses $A_1$ and $A_2$ are divided into two lens groups, one lens group $A_1$ is held by the base movable tube section 210, 310 (in an instance shown in the figure, a tube member 213, 313 that is attachably and detachably supported by the inside of the base movable tube section 210, 310) and the other lens group $A_2$ is held by the top movable tube section 211, 311. Then, the fixed diaphragm plate 212, 314 is located between the two lens groups $A_1$ and $A_2$. With such a configuration (that is, the lenses are divided into two lens groups $A_1$ and $A_2$ and the fixed diaphragm plate 212, 314 is located between both lens groups $A_1$ and $A_2$), it is possible to restrict an aberration fluctuation at a time of focus adjustment (that is, the fluctuation (degradation) of the aberration of a lens system due to the focus adjustment). On this occasion, the fixed diaphragm plate 212, 314 may have an opening (diaphragm opening) in the shape of a disk.

In a case of a variable diaphragm 312 as exemplarily shown in FIGS. 4(a) through (c), diaphragm blades rub against each other due to the vibration with earthquakes or the other reasons, and dusts generate, and at the result, an image noise may be generated. On the other hand, in a case where the above-mentioned fixed diaphragm plate 212 is used, it is possible to restrict such a generation of the dusts or the noise.

Preferably, the fixed diaphragm plate 212, 314 can be exchanged by detaching the top movable tube section 211, 311 from the base movable tube section 210, 310.

Furthermore, as exemplarily shown in FIGS. 3(b) through (d), one or more fixed diaphragm plates for exchange 212Aa, 212Ba and 212Ca that respectively have openings 212Aa, 212Ba, 212Ca different from the opening of the fixed diaphragm plate 212 (not shown) are prepared, so that it can be properly exchanged. For instance, if the camera body B is set at a lighted place, such as the outdoors, the fixed diaphragm plate for exchange 212Aa having the smallest opening 212Aa as exemplarily shown in FIG. 3(b) may be attached to the lens barrel 2, and if it is set at a dark place, such as an indoor corridor, the fixed diaphragm plate for exchange 212Ba, 212Ca having the bigger opening 212Ba, 212Ca as exemplarily shown in FIG. 3(c), (d) may be attached to the lens barrel 2. Preferably, the fixed diaphragm plate 212, 212A, 212B, 212C are thick in order to shut out the light and ensure mechanical strength. But, such a plate is preferably thin from a viewpoint of optics. Then, the plate has the thickness in a range of 0.05 to 0.1 mm in order to satisfy all points.

Preferably, a through hole 11c, 211c, 213c is formed at a section that holds the lenses $A_1$ and $A_2$ ("the lens holding section" hereinafter) in the movable tube section (see reference numbers 11 of FIG. 1 and 211, 213 of FIG. 3(a)) so as to fill adhesive (not shown) between the outer peripheral surface of the lenses $A_1$ and $A_2$ and the lens holding section 11, 211, 213 via the through hole 11c, 211c, 213c. In such a configuration, it is possible to pour the adhesive between the outer peripheral surface of the lenses $A_1$ and $A_2$ and the lens holding section 11, 211, 213, and to prevent the positional shift of the respective lenses $A_1$ and $A_2$ from proper positions even if the lens barrel 2 is attached to the camera body B for a long term.

A method of setting the lens barrel 2 according to the invention is now mentioned.

At the setting of the lens barrel 2, the base end 20a of the fixed tube section 20 is installed on the cameral body B and is fixed. Preferably, on this occasion, adhesive is coated between the base end 20a and the camera body B so as to prevent a loosening of the fixed tube section 20 due to the vibrations.

After attaching the fixed tube section 20 to the camera body B, the fixed diaphragm plate 212, 212A, 212B or 212c that has a most suitable opening is selected, watching a place for setting the camera (that is, the camera body B and the lens barrel 2) and the selected fixed diaphragm plate 212, 212A, 212B or 212C is inserted between the base movable tube section 210 and the top movable tube section 211. On this occasion, preferably an adhesive is coated on a portion abutting the base movable tube section 210 and the top movable tube section 211 on each other, such as a pitch screw section that is not shown so as not to loosen the movable tube sections 210, 211 due to the vibrations. Preferably, the nut member 22 is attached to the base movable tube section 210, and the base movable tube section 210 is attached to the fixed tube section 20. The adhesive is able to be coated before a step of setting the camera body B or the lens barrel 2 for the purpose of preventing the loosening, so that it is possible to freely move the position of the camera body B or the lens barrel 2 in order to easily coat the adhesive and to effectively conduct the coating work of the adhesive. In the above-mentioned embodiment, attachment of the fixed tube section 20 to the camera body B, the attachment of the fixed diaphragm plate to the movable tube section 21, and the attachment of the movable tube section 21 to the fixed tube section 20 are conducted in this order, but the order of the respective processes may be changed.

Thereafter, the camera body B attaching the lens barrel 2 thereto is set at a predetermined place, a focus is adjusted by rotating the movable tube section 21, and the camera body B is fixed through the nut member 22 upon completion of such an adjustment. It is necessary to adjust the focus in a state of setting the camera body B at a proper site. For this reason, when the focus is fixed (that is, when the relative rotation between the movable tube section 21 and the fixed tube section 20 is restrained) with the adhesive, it may be difficult to coat the adhesive, depending on the state of setting the camera body B or its setting position. In a case where the camera body B is suspended from a ceiling or an edge of eaves, for instance, it is necessary to coat the adhesive, suspending camera body B from the ceiling or the edge of the eaves and necessary for the worker to coat the adhesive in an uncomfortable position. For this reason, the adhesive may flow into an unintended part or may drip. Besides, the focus may be shifted due to the vibrations, such as the vibrations due to winds and the vibrations from cars traveling on a road close thereto before sufficiently hardening the adhesive. According to the invention, it is possible to solve such a problem since the focus is fixed through the nut member 22.

Preferably, a first knurling 20e, exemplarily shown in FIG. 2(a), (b), formed on the outer peripheral surface of the fixed tube section 20 that is a projected and recessed section, or/and a second knurling 11d, exemplarily shown in FIG. 1 formed on the outer peripheral surface of the movable tube section 11 that is a projected and recessed section are provided have shapes and/or colors different from the first knurling 20e and/or the second knurling 11d. By doing so, it is possible to clearly distinguish the first and second knurling 20e, 11d from the nut members 12, 22 through a visual sense and a sense of touch, and to prevent error operation or the like. Especially, if these are formed with different colors, it is possible to indicate a commentary of a product manual to be easily known.

Preferably, as exemplarily shown in FIG. 6, an elastic member 33 is located between the fixed tube section 30 and the movable tube section 31 so as to energize the movable tube section 31 in the optical axis direction C (that is, the optical axis direction of the lens barrel 3, and the optical axis direction of the lenses $A_1$ and $A_2$ that the movable tube section 31 holds). By doing so, the relative movement between the fixed tube section 30 and the movable tube section 31 in the optical axis direction C is restricted through the spring member 33 before tightening by the nut member 32 even if some rattling (the rattling in a thrust direction) occurs between the first pitch screw 30d and the second pitch screw 31b, and it is possible to prevent the deviation of the focus and the like due to the relative movement. Preferably, the elastic member 33 is a coil spring member (concretely, a compression coil spring) energizing the movable tube section 31 in a direction departing from the fixed tube section 30 (the right direction in FIG. 6, and the direction where the movable tube section 31 is moved by tightening the nut member 32), but a similar construction may be realized with another elastic members, as well as the spring members other than the coil spring member.

EXPLANATION OF REFERENCE NUMBERS

1 . . . lens barrel
2 . . . lens barrel
3 . . . lens barrel
10 . . . fixed tube section
10a . . . base end of fixed tube section
10b . . . top end of fixed tube section
10c . . . inner peripheral face of the fixed tube section
10d . . . first pitch screw (pitch screw section on fixed tube side)
11 . . . movable tube section, lens holding section
11a . . . outer peripheral surface of movable tube section
11b . . . second pitch screw (pitch screw section on movable tube side)
11c . . . through hole
11d . . . second knurling (on movable tube side)
12 . . . nut member
20 . . . fixed tube section
20a . . . base end of fixed tube section
20b . . . top end of fixed tube section
20c . . . inner peripheral surface of fixed tube section
20d . . . first pitch screw (pitch screw section on fixed tube side)
20e . . . first knurling (on fixed tube side)
21 . . . movable tube section
21a . . . outer peripheral surface of movable tube section
21b . . . second pitch screw (on movable tube side)
22 . . . nut member
30 . . . fixed tube section
30a . . . base end of fixed tube section
30b . . . top end of fixed tube section
30c . . . inner peripheral surface of fixed tube section
30d . . . first pitch screw (on movable tube side)
30e . . . first knurling (on fixed tube side)
31 . . . movable tube section
31a . . . outer peripheral surface of movable tube section
31b . . . second pitch screw (on movable tube side)
32 . . . nut member
33 . . . spring member
210 . . . base movable tube section
211 . . . top movable tube section (lens holding section)
211c . . . through hole
212 . . . fixed diaphragm plate
212A, 212B, 212C . . . fixed diaphragm plate for exchange
212Aa, 212Ba, 212Ca . . . opening
213 . . . lens holing section
213c . . . through hole
310 . . . base movable tube section
311 . . . top movable tube section (lens holding section)
314 . . . fixed diaphragm plate
$A_1, A_2$ . . . lens
B . . . camera body

The invention claimed is:
1. A lens barrel configured for detachably attaching to a camera body, comprising:
a fixed tube section that has a base end for detachably attaching to the camera body, a top end, and a first pitch screw section formed on an inner peripheral surface of the top end;
a movable tube section that is a tube member for holding a plurality of lenses and has a second pitch screw section formed at an outer peripheral surface, and is located so as to be movable inside the fixed tube section in such a state that the second pitch screw is threadedly engaged with the first pitch screw;
a nut member threadedly engaged with the second pitch screw and abutting on the top end of the fixed tube section, so as to restrict a relative rotation between the fixed tube section and the movable tube section;
wherein the plurality of lenses are two groups of lenses, a first group and a second group, held within the movable tube section;
wherein the movable tube section has:
a base movable tube section that has the second pitch screw and holding the first group of lenses;
a top movable tube section detachably attached to the base movable tube section and holding the second group of lenses; and
a first fixed diaphragm plate having a fixed diameter opening located between the base movable tube section and the top movable tube section and being located between the first and second groups of lenses; and
one or more replacement fixed diaphragm plates having fixed diameter openings different from the fixed diameter opening of the first fixed diaphragm plate, the one or more replacement diaphragm plates configured for exchange with the first fixed diaphragm plate.

2. The lens barrel according to claim 1, wherein the first fixed diaphragm plate is held between the base movable tube section and the top movable tube section.

3. The lens barrel according to claim 1, wherein a through hole is formed in the top movable tube section that holds the second group of lenses;
whereby an adhesive can be filled between the outer peripheral surface of the second group of lenses and the top movable tube section via the through hole.

4. The lens barrel according to claim 1, wherein the fixed tube section has an outer peripheral surface and a first knurling is formed on the outer peripheral surface that is a projected and recessed section.

5. The lens barrel according to claim 1, wherein the lenses held by the movable tube section have an optical axis and the lens barrel further comprising an elastic member located between the fixed tube section and the movable tube section so as to energize the movable tube section in the optical axis direction of the lenses held by the movable tube section.

6. The lens barrel according to claim 5, wherein the elastic member is a coil spring member.

7. The lens barrel according to claim 4, wherein a second knurling is formed on the outer peripheral surface of the movable tube section that is a projected and recessed section.

8. The lens barrel according to claim 7, wherein the nut member has a knurling shape that is different from the first knurling and/or the second knurling.

9. The lens barrel according to claim 7, wherein the nut member has a knurling that has a different color than the first knurling and/or the second knurling.

10. A lens barrel configured for detachably attaching to a camera body, comprising:

a fixed tube section that has a base end for detachably attaching to the camera body, a top end, and a first pitch screw section formed on an inner peripheral surface of the top end;

a movable tube section that is a tube member for holding a plurality of lenses and has a second pitch screw section formed at an outer peripheral surface, and is located so as to be movable inside the fixed tube section in such a state that the second pitch screw is threadedly engaged with the first pitch screw; and a nut member threadedly engaged with the second pitch screw and abutting on the top end of the fixed tube section, so as to restrict a relative rotation between the fixed tube section and the movable tube section;

wherein the plurality of lenses are two groups of lenses, a first group and a second group, held within the movable tube section;

wherein the movable tube section has:

a base movable tube section that has the second pitch screw and holding the first group of lenses;

a top movable tube section detachably attached to the base movable tube section and holding the second group of lenses; and a fixed diaphragm plate having a fixed diameter opening located between the base movable tube section and the top movable tube section and being located between the first and second groups of lenses;

wherein the fixed diaphragm plate is detachable by removing the top movable tube section from the base movable tube section.

11. The lens barrel according to claim 10, further being provided with one or more fixed diaphragm plate for exchange having an opening different from the fixed diameter opening in the fixed diaphragm plate.

12. The lens barrel according to claim 10, wherein the fixed diaphragm plate is held between the base movable tube section and the top movable tube section.

13. The lens barrel according to claim 10, wherein a through hole is formed in the top movable tube section that holds the second group of lenses;

whereby an adhesive can be filled between the outer peripheral surface of the second group of lenses and the top movable tube section via the through hole.

14. The lens barrel according to claim 10, wherein the fixed tube section has an outer peripheral surface and a first knurling is formed on the outer peripheral surface that is a projected and recessed section.

15. The lens barrel according to claim 14, wherein a second knurling is formed on the outer peripheral surface of the movable tube section that is a projected and recessed section.

16. The lens barrel according to claim 15, wherein the nut member has a knurling shape that is different from the first knurling and/or the second knurling.

17. The lens barrel according to claim 15, wherein the nut member has a knurling that has a different color than the first knurling and/or the second knurling.

18. The lens barrel according to claim 10, wherein the lenses held by the movable tube section have an optical axis and the lens barrel further comprising an elastic member located between the fixed tube section and the movable tube section so as to energize the movable tube section in the optical axis direction of the lenses held by the movable tube section.

19. The lens barrel according to claim 18, wherein the elastic member is a coil spring member.

* * * * *